United States Patent [19]

Nagai et al.

[11] 4,390,818
[45] Jun. 28, 1983

[54] TELEVISION RECEIVER

[75] Inventors: Tamiji Nagai, Kawasaki; Yoshio Ishigaki, Tokyo, both of Japan

[73] Assignee: Sony Corporation, Tokyo, Japan

[21] Appl. No.: 286,205

[22] Filed: Jul. 22, 1981

[30] Foreign Application Priority Data

Jul. 25, 1980 [JP] Japan ............................ 55-102577

[51] Int. Cl.³ .............................................. H01J 29/70
[52] U.S. Cl. ...................................... 315/408; 315/411
[58] Field of Search ............... 315/411, 408; 358/190

[56] References Cited
U.S. PATENT DOCUMENTS

| | | | |
|---|---|---|---|
| 4,099,101 | 7/1978 | Teuling | 315/408 |
| 4,153,862 | 5/1979 | Lim | 315/408 |
| 4,215,296 | 7/1980 | Mitamura et al. | 315/411 |

*Primary Examiner*—Theodore M. Blum
*Attorney, Agent, or Firm*—Lewis H. Eslinger; Alvin Sinderbrand

[57] ABSTRACT

A television receiver having a horizontal output transistor includes a collector and an emitter respectively connected to a first potential and a second ground potential, a first series circuit of first and second damper diodes connected between the first potential and ground potential, a second series circuit of a deflection coil and an S-shaping capacitor connected in parallel with the collector-emitter path of the transistor, a retrace capacitor connected between the first potential and second ground potential, respectively, a third capacitor connected between the cathode of the second damper diode and the second ground potential, a first voltage supply source connected to the first potential through a choke coil, and a second voltage supply source connected to the anode of the second damper diode through a primary winding of a transformer of a load circuit, the voltage $E_1$ supplied by the first voltage supply source being selected greater than or equal to the voltage $E_2$ supplied by the second voltage supply source.

7 Claims, 13 Drawing Figures

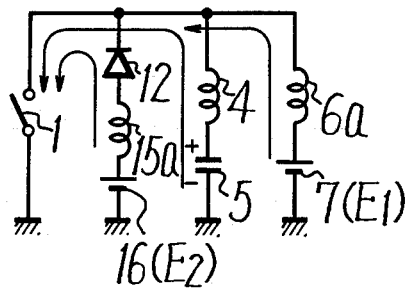
FIG. 3A
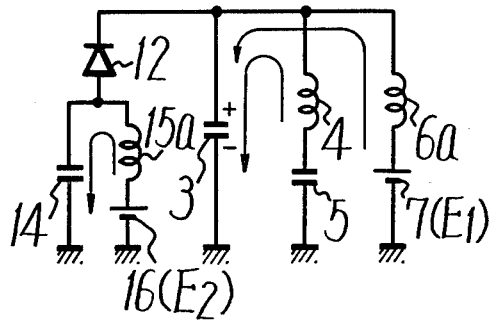
FIG. 3B
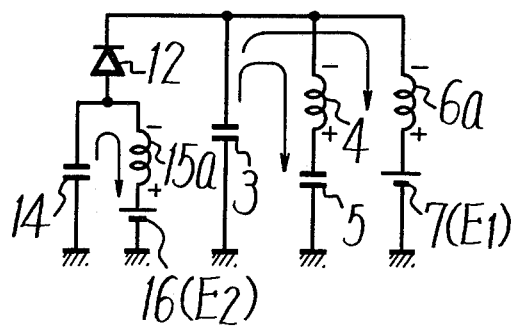
FIG. 3C
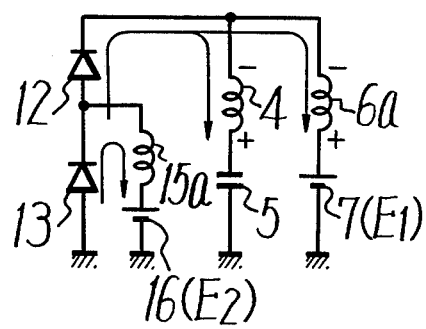
FIG. 3D
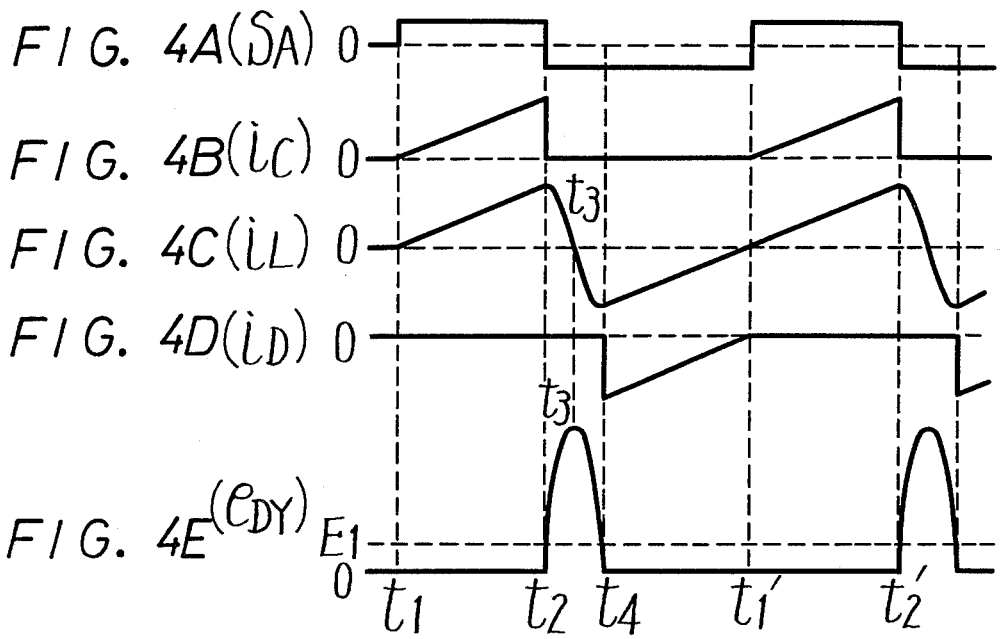

TELEVISION RECEIVER

BACKGROUND OF THE INVENTION

1. Field of the Invention

The present invention relates generally to a television receiver, and more particularly, is directed to a television receiver in which a power supply source for a load circuit such as an audio output circuit and the like is derived from a horizontal deflection circuit or high voltage switching circuit.

2. Description of the Prior Art

There has been proposed a system in which a power supply source for, for example, an audio output circuit is obtained from a horizontal deflection circuit or a high voltage switching circuit which has substantially the same construction as the horizontal deflection circuit.

As shown in FIG. 1, a prior art circuit in which the power supply source for the audio output circuit is derived from the horizontal deflection circuit will be described. The prior art circuit includes a horizontal output transistor 1, a damper diode 2 connected in parallel with the collector-emitter path of transistor 1 a resonant capacitor 3 connected in parallel with diode 2, and a series circuit of a horizontal deflection coil 4 and an S-shaping capacitor 5 connected in parallel with diode 2. In the circuit of FIG. 1, there are further provided a fly-back transformer 6 having a primary winding 6a and a secondary winding, and a DC power supply source 7 which is connected between ground and transformer 6 and which supplies power voltage through primary winding 6a of fly-back transformer 6 or choke coil to the collector of transistor 1.

Further, a horizontal drive circuit 8 is provided through which a horizontal oscillation output from an input terminal 9 is applied to the base of horizontal output transistor 1 to turn transistor 1 ON and OFF. When transistor 1 is turned OFF, a fly-back or retrace pulse is obtained at the collector of transistor 1. This fly-back pulse is voltage-double-rectified by a high voltage rectifier circuit (not shown) at the side of secondary winding 6b of fly-back transformer 6 and derived as a high voltage.

In the circuit of FIG. 1, an audio power supply transformer 10 is connected in parallel with fly-back transformer 6 and, at the secondary winding side thereof, the fly-back pulse is rectified by a rectifier circuit 11 as a low voltage rectifier output which serves as the power supply source for the audio output circuit.

With the above prior art circuit, since audio power supply transformer 10 is connected in parallel with both fly-back transformer 6 and horizontal deflection coil 4, the pulse voltages of deflection coil 4 and fly-back transformer 6 are modulated by the output from the audio output circuit, which results in flicker of the reproduced picture.

OBJECTS AND SUMMARY OF THE INVENTION

Accordingly, it is an object of the present invention to provide a novel television receiver that is free from the defects inherent in the prior art.

Another object of the present invention is to provide a television receiver with which flicker in the reproduced picture is prevented when a power supply source for a load circuit, such as an audio output circuit or the like, is obtained from a horizontal deflection circuit or a high voltage switching circuit.

According to an aspect of the present invention, a televison receiver includes a horizontal output transistor having a collector-emitter path connected between first and second potentials, a first series circuit of first and second damper diodes connected between the first and second potentials, a second series circuit of a deflection coil and an S-shaping capacitor connected between the first and second potentials, a retrace capacitor connected between the first and second potentials respectively, a third capacitor connected between the cathode of the second damper diode and the second potential, a first voltage supply source connected to the first potential through a choke coil, and a second voltage supply source connected to the cathode of the second damper diode through a primary winding of a transformer of a load circuit, the voltage $E_1$ supplied by the first voltage supply souce being selected greater than or equal to the voltage $E_2$ supplied by the second voltage supply source.

The above, and other, objects, features and advantages of the present invention will become apparent from the following description of illustrative embodiments of the invention which is to be read in connection with the accompanying drawings.

BRIEF DESCRIPTION OF THE DRAWINGS

FIGS. 3A–3D and 4A–4E are respectively equivalent circuits and waveform diagrams used to explain the circuit of the present invention shown in FIG. 2.

DETAILED DESCRIPTION OF THE PREFERRED EMBODIMENTS

Figure 1:
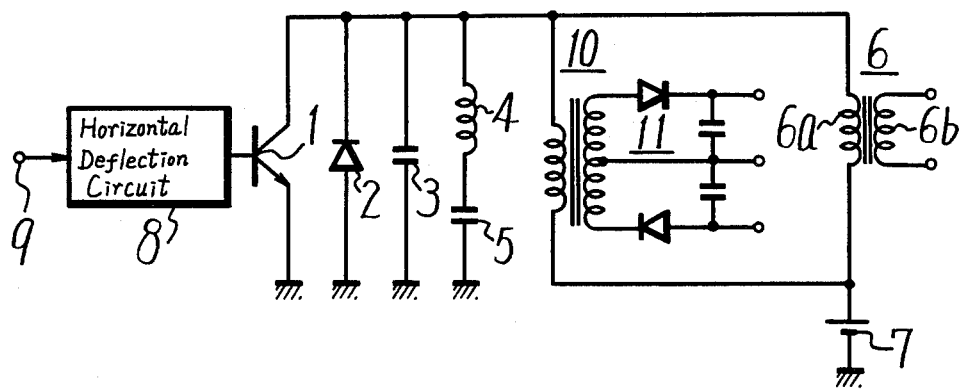
FIG. 1 is a circuit wiring diagram of a power supply circuit for a horizontal output circuit and a load circuit of a prior art television receiver.
Figure 2:
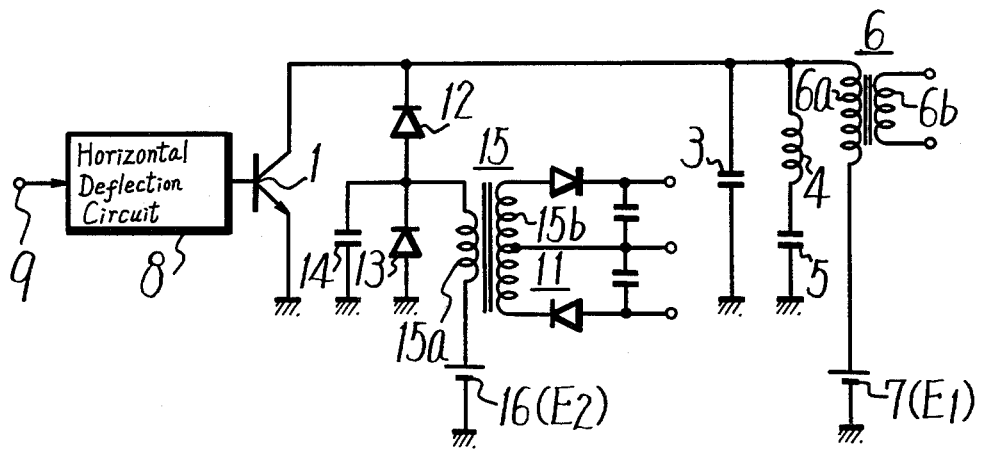
FIG. 2 is a circuit wiring diagram of a power supply circuit for a horizontal output circuit and a load circuit of a television receiver according to one embodiment of the present invention.

Referring to the drawings in detail, and initially to FIG. 2 thereof, a television receiver according to one embodiment of the present invention in which a power supply source for an audio output circuit is obtained from a horizontal deflection circuit will now be described. In the circuit of FIG. 2, in place of damper diode 2 used in the prior art circuit of FIG. 1 a series connection of two diodes 12 and 13 arranged in the same direction as diode 2 are used.

A capacitor 14 is connected in parallel with diode 13, and a series connection of a primary winding 15a of an audio power supply transformer 15 and a DC power supply source 16 is also connected in parallel with diode 13. The voltage induced at the side of a secondary winding 15b of transformer 15 is rectified by a rectifier circuit 11 as a power supply source for the audio output circuit. In this case, the voltage $E_1$ of DC power supply source 7 and voltage $E_2$ of DC power supply source 16 are selected to satisfy the condition $E_1 \geq E_2$.

Further, in the circuit of FIG. 2, if it is assumed that the self-inductance of primary winding 15a of transformer 15 is given as $L_S$, the self-inductance of deflection coil 4 as $L_Y$ and the self-inductance of primary winding 6a of fly-back transformer 6 as $L_F$, the values thereof are selected such that the following condition is established:

$$L_S > L_O$$

where $$L_O = [(L_F L_Y)/(L_F + L_Y)]$$

If the circuit is constructed as described above diode 12 effectively serves as a switching element and the pulse voltages obtained at the deflection coil and the fly-back transformer are not affected by the magnitude of the output from the audio output circuit.

Referring now to FIGS. 3 and 4, the operation of the horizontal deflection circuit shown in FIG. 2 will be explained in greater detail.

With the circuit of FIG. 2, when the switch or transistor 1 is in its OFF state as shown in FIG. 3A, since a reverse bias is applied to diodes 12 and 13, no current flows through the circuit. When a horizontal drive pulse $S_A$ which is transmitted through horizontal drive circuit 8 becomes a pulse of positive polarity during a horizontal scanning period from time $t_1$ to time $t_2$, as shown in FIG. 4A transistor 1 turns ON, and current flows through transistor 1, and therefore through deflection coil 4 and windings 6a and 15a, as indicated by the arrows in FIG. 3A. Thus, a collector current $i_C$ flows through deflection coil 4, which current $i_C$ increases in a linear manner with time, as shown in FIG. 4B.

Thereafter, when drive pulse $S_A$ becomes a pulse of negative polarity at time $t_2$, transistor 1 turns OFF, and hence, the collector current $i_C$ becomes zero. However, during the short horizontal fly-back period from time $t_2$ to time $t_4$, there is caused a resonance operation by the resonant circuit consisting of capacitor 3, deflection coil 4 and winding 6a and by the resonant circuit consisting of capacitor 14 and winding 15a. In particular, during the period from time $t_2$ to time $t_3$ of the horizontal fly-back period (from time $t_2$ to time $t_4$), charging currents respectively flow to capacitors 3 and 14 in the directions indicated by the arrows in FIG. 3B, and a deflection coil current $i_L$ decreases gradually and becomes zero at time $t_3$, as shown in FIG. 4C. During the period from time $t_3$ to time $t_4$ of the horizontal fly-back period (from time $t_2$ to time $t_4$), discharging currents respectively flow from capacitor 3 to deflection coil 4 and winding 6a and from capacitor 14 to winding 15a, as shown by the arrows in FIG. 3C. In other words, current opposite in direction to that of the former current flows through deflection coil 4.

With a resonant circuit consisting of only an inductance and a capacitor, thereafter an inductance current starts to flow through and charge the resonant capacitor with a polarity opposite to the former polarity. However, in the circuit of the invention, diodes 12 and 13 are provided, so that during the former half period from time $t_4$ to time $t_1'$ of the next horizontal scanning period, the terminal voltages across windings 6a and 15a respectively become higher than the power supply source voltages $E_1$ and $E_2$. Therefore, diodes 12 and 13 are biased in the forward direction and turn ON. Thus, the currents flowing through windings 6a and 15a respectively flow through diodes 12 and 13, while charging the DC power supply sources 7 and 16 which absorb the resonant phenomenon, as shown in FIG. 3D. In other words, a damper current $i_D$ shown in FIG. 4D which flows through diodes 12 and 13 flows through deflection coil 4.

During the horizontal fly-back period from time $t_2$ to time $t_4$ in which transistor 1 turns OFF, a positive pulse voltage $e_{DY}$, shown in FIG. 4E and higher than the power supply source voltage $E_1$, is generated in deflection coil 4 and fly-back transformer 6. Similarly, a positive pulse voltage $e_S$ higher than the power supply source voltage $E_2$ is generated in transformer 15. Since the magnitudes of the pulse voltages $e_{DY}$ and $e_S$ are such that the mean values thereof respectively become equal to the power supply source voltages $E_1$ and $E_2$, the condition $e_{DY} \geq e_S$ is obtained from the condition $E_1 \geq E_2$.

Accordingly, during the horizontal fly-back period from time $t_2$ to time $t_4$ in which the pulse voltages $e_{DY}$ and $e_S$ are generated, diode 12 turns OFF so that the circuit part of deflection coil 4 and the circuit part of transformer 15 operate under separate states. Thus, the pulse voltages obtained at deflection coil 4 and fly-back transformer 6 are not influenced by the audio output circuit connected to the secondary winding side of transformer 15.

Further, since the circuit elements in the embodiment of FIG. 2 are selected so as to satisfy the condition $L_S > L_O$, the following is achieved.

When the voltage values $E_1$ and $E_2$ of power supply sources 7 and 16 are equal to each other, that is, when $E_1 = E_2$, if the load from fly-back transformer 6 becomes large, the fly-back pulse voltage $e_{DY}$ becomes lower than the pulse voltage $e_S$ obtained at transformer 15. Thus, power is transmitted from transformer 15 through diode 12 to fly-back transformer 6 to increase the pulse voltage $e_{DY}$. Since, however, the deflection power $(L_Y \cdot I_Y^2)$ is small due to lowering of the high voltage, when the pulse voltage $e_{DY}$ increases, the reproduced picture becomes deformed or distorted.

To the contrary, when the condition $L_S > L_O$ is satisfied, as with this invention, current $I_S$ flowing through the inductance $L_S$ is small. Therefore, the power becomes equal to $L_S I_S^2 < L_O I_O^2$ ($I_O$ is the current flowing through $L_O$), and accordingly, the power transmitted from the side of transformer 15 to the side of fly-back transformer 6 can be made small. Thus, deformation of the reproduced picture is prevented.

In order to improve a high voltage regulation, higher harmonics, such as third, fifth and so on harmonics may be superimposed on the fly-back pulse voltage $e_{DY}$. In such case, when the superimposed higher harmonics of the voltage $e_{DY}$ become lower than those of the pulse voltage $e_S$, if the condition $L_S > L_O$ is satisfied, deformation or distortion of the reproduced picture can be avoided.

Although one embodiment of the invention is shown in the circuit of FIG. 2 in which the power supply source is derived for a single audio output circuit, it is also possible that a power supply source is provided for such a circuit in which a load current thereof will affect the high voltage, in addition to the power supply source for the audio output circuit.

Figure 5:
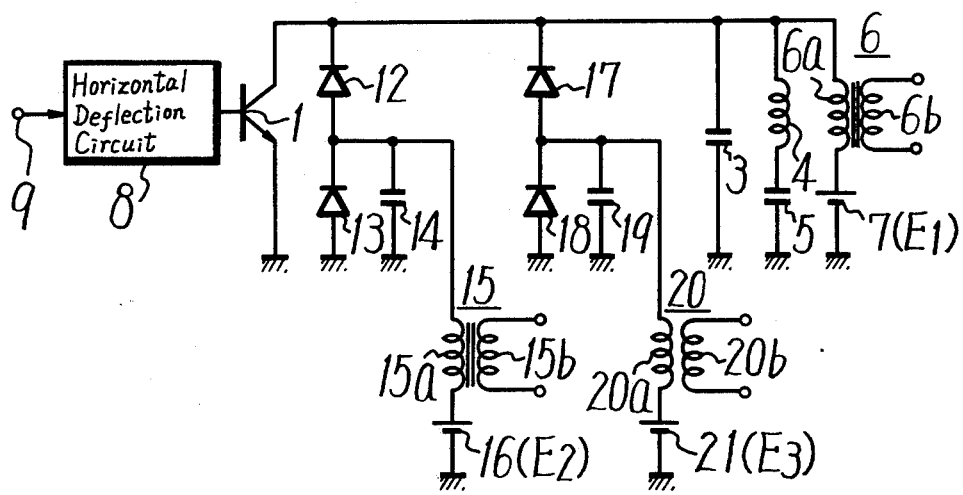
FIGS. 5 and 6 are circuit-wiring diagrams of essential portions of a television receiver according to other embodiments of the invention.
Figure 6:
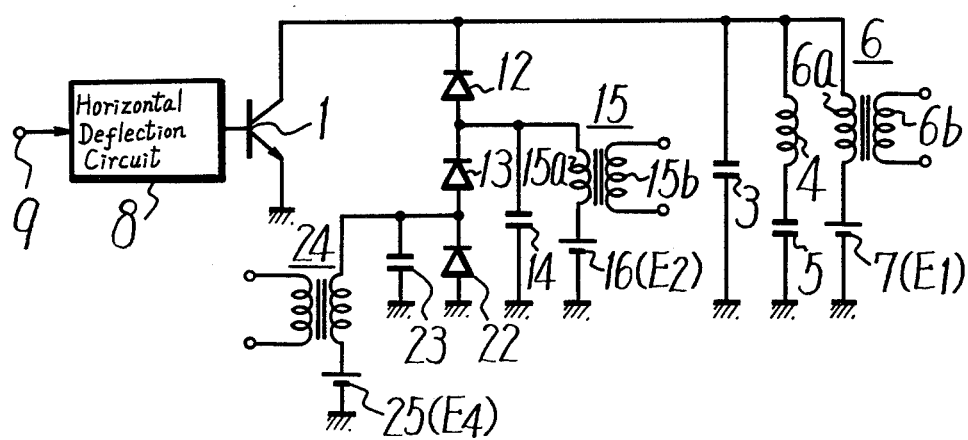

Referring now to FIGS. 5 and 6 other embodiments of the invention will now be described, in which elements corresponding to those in the circuit of FIG. 2 are identified by the same reference numerals and a detailed description thereof will be omitted herein for the sake of brevity.

In the embodiment of the invention shown in FIG. 5, in parallel to the circuit consisting of diodes 12, 13, capacitor 14, transformer 15 and DC power supply source 16, a circuit is connected which is formed of diodes 17, 18, a capacitor 19, a transformer 20 having primary and secondary windings 20a and 20b and a DC power supply source 21 having a voltage $E_3$, the latter elements being connected in the same manner as the former elements. With the circuit of FIG. 5, the voltage $E_3$ of DC power supply source 21 is selected so that $E_1 \geq E_3$, in addition to the voltage $E_2$ of DC power supply source 16 being less than or equal to the voltage $E_1$ of DC power supply source 7. In this circuit, when the inductance of primary winding 20a of transformer 20 is given as $L_S'$, if $L_S'$ is selected to satisfy the condition $L_O < L_S'$, distortion in the reproduced picture can be prevented in a similar manner to the former embodiment of the invention as shown in FIG. 2.

In the embodiment of the invention shown in FIG. 6, between the anode of diode 13 and the ground, a diode 22 is inserted in the same direction as diode 13. Further, a capacitor 23 is connected in parallel with the diode 22, and a series connection of a transformer 24 and a DC power supply source 25 is also connected in parallel with diode 22. Capacitor 14 and the series circuit of transformer 15 and DC power supply source 16 are each connected in parallel with the series circuit of diodes 13 and 22. In this circuit, when the voltage of the DC power supply source 25 is given as $E_4$, the voltages are selected to satisfy the condition $E_1 \geq E_2 \geq E_4$.

Further, when the inductance of the primary winding of transformer 24 is assumed to be $L_S''$, if the inductances are selected to satisfy the condition $L_O < L_S < L_S''$, distortion in the reproduced picture can be prevented in a similar manner the former embodiments.

In all of the above embodiments of the invention, a power supply voltages for the load circuit, such as the audio output circuit and so on, are derived from the horizontal deflection circuit. However, the present invention can be applied to the case where, when separate transistors are used for the high voltage and the deflection output, as described previously, the power supply source is derived from either the high voltage generating circuit side or the deflection output circuit side.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

We claim as our invention:

1. In a television receiver of the type including a first load circuit having a transformer with a winding, apparatus comprising:
   horizontal output transistor means having an output path connected between a first terminal at a first potential and a second terminal at a second potential;
   first series circuit means comprised of at least first and second damper means connected together at a connection point and connected in series between said first and second terminals;
   second series circuit means comprised of deflection coil means and S-shaping capacitor means connected in series between said first and second terminals;
   retrace capacitor means connected between said first and second terminals;
   third capacitor means connected between said connection point and said second terminal;
   choke coil means;
   first voltage supply source means connected to said first terminal through said choke coil means; and
   second voltage supply source means connected to said connection point through the winding of said transformer of said first load circuit, the voltage supplied by said first voltage supply source means being selected to be at least as large as the voltage supplied by said second voltage supply source means.

2. In a television receiver of the type including a first load circuit and a second load circuit, each having a transformer with a winding, apparatus comprising:
   horizontal output transistor means having an output path connected between a first potential and a second potential;
   first series circuit means comprised of at least first and second damper means connected between said first and second potentials;
   second series circuit means comprised of deflection coil means and S-shaping capacitor means connected between said first and second potentials;
   retrace capacitor means connected between said first and second potentials;
   third capacitor means connected between said second damper means and said second potential;
   choke coil means;
   first voltage supply source means connected to said first potential through said choke coil means;
   second voltage supply source means connected to said second damper means through the winding of said transformer of said first load circuit, the voltage supplied by said first voltage supply source means being selected to be at least as large as the voltage supplied by said second voltage supply source means;
   third damper means connected between said second damper means and said second potential;
   fourth capacitor means connected between said third damper means and said second potential; and
   third voltage supply source means connected to said third damper means through the winding of said transformer of said second load circuit, the relation between the voltages generated by said first voltage supply source means, said second voltage supply source means and said third voltage supply source means being selected as $E_1 \geq E_2 \geq E_3$, where $E_1$ represents the voltage supplied by said first voltage supply source means, $E_2$ represents the voltage supplied by said second voltage supply source means and $E_3$ represents the voltage supplied by said third voltage supply source means.

3. In a television receiver of the type including first auxiliary output circuit means, apparatus comprising:
   horizontal output transistor means having an output path connected between first and second terminals at first and second potentials, respectively;
   first series circuit means comprised of deflection coil means and S-shaping capacitor means connected in parallel with said output path of said transistor means;
   retrace capacitor means connected in parallel with said first series circuit means;
   flyback transformer coil means;

first voltage supply means connected to said first terminal through said flyback transformer coil means; and means for preventing said auxiliary output circuit means from affecting operation of said flyback transformer coil means and said deflection coil means at least during horizontal flyback periods.

4. In a television receiver of the type according to claim 3; said means for preventing including second series circuit means comprised of first and second damper diode means connected between said first and second terminals and connected together at a connection point, and said first auxiliary output circuit means including transformer means having primary coil means connected at one end to said connection point.

5. In a television receiver of the type according to claim 4; said means for preventing further including third capacitor means connected between said connection point and said second terminal, and second voltage supply means connected to an opposite end of said primary coil means, the voltage supplied by said first voltage supply means being selected to be at least as large as the voltage supplied by said second voltage supply means.

6. In a television receiver of the type including first auxiliary output circuit means having transformer means with primary coil means and second auxiliary output circuit means having transformer means, apparatus comprising:

horizontal output transistor means having an output path connected between first and second potentials;

first series circuit means comprised of deflection coil means and S-shaping capacitor means connected in parallel with said output path of said transistor means;

retrace capacitor means connected in parallel with said first series circuit means;

flyback transformer coil means;

first voltage supply means connected to said first potential through said flyback transformer coil means; and means for preventing said auxiliary output circuit means from affecting operation of said flyback transformer coil means and said deflection coil means and including second series circuit means comprised of first and second damper diode means connected between said first and second potentials and connected together at a connection point, said primary coil means of said first auxiliary output means connected at one end to said connection point, said second series circuit means further including third damper diode means connected in series with said first and second damper diode means and connected to said second damper diode means at a second connection point, and said means for preventing further including third capacitor means connected between said first-mentioned connection point and said second potential, fourth capacitor means connected between said second connection point and said second potential, second voltage supply means connected between an opposite end of said primary coil means and said second potential, and third voltage supply means connected to said second connection point through said transformer means of said second auxiliary output circuit means, the voltage supplied by said second voltage supply means being selected to be at least as large as the voltage supplied by said third voltage supply means.

7. In a television receiver of the type including auxiliary output circuit means, apparatus comprising:

horizontal output means;

deflection means connected to said output means and including deflection coil means and capacitor means;

retrace capacitor means connected to said output means;

flyback transformer coil means connected to said output means;

first voltage supply means connected to said flyback transformer coil means; and means for preventing said auxiliary output circuit means from affecting operation of said flyback transformer coil means and said deflection means at least during horizontal flyback periods.

* * * * *